United States Patent [19]
Wisyanski et al.

[11] 3,790,077
[45] Feb. 5, 1974

[54] TEMPERATURE-SENSITIVE BLEED VALVE

[75] Inventors: Thomas William Wisyanski, Bristol; Richard Alfred Northrop, Jr., Cheshire, both of Conn.

[73] Assignee: Scovill Manufacturing Company, Waterbury, Conn.

[22] Filed: Mar. 12, 1973

[21] Appl. No.: 340,596

[52] U.S. Cl.............. 236/101, 137/525.3, 236/87
[51] Int. Cl. ............................................ G05d 23/08
[58] Field of Search.... 236/87, 101; 137/525, 525.3

[56]  References Cited
UNITED STATES PATENTS

| | | |
|---|---|---|
| 3,460,754 | 8/1969 | Templin et al........................ 236/87 |
| 3,319,888 | 5/1967 | Creager ................................ 236/87 |
| 3,729,132 | 4/1973 | Ludwig................................ 236/87 |
| 3,077,205 | 2/1963 | Butterworth........................ 137/525 |
| 3,207,171 | 9/1965 | Kryman ............................ 137/525.3 |
| 2,684,081 | 7/1954 | Chace................................. 137/525 |

*Primary Examiner*—William E. Wayner
*Assistant Examiner*—William E. Tapolcai, Jr.
*Attorney, Agent, or Firm*—Dallett Hoopes

[57] ABSTRACT

Temperature-sensitive bleed valve has bimetallic disc mounted between O-ring and retainer ring to accommodate variations in casting of valve housing and to hold firmly despite vibrations. The valve operates effectively irrespective of its mounting position.

5 Claims, 4 Drawing Figures

PATENTED FEB 5 1974　　　　　　　　　　　3,790,077

TEMPERATURE-SENSITIVE BLEED VALVE

BACKGROUND OF THE INVENTION

1. Field of the Invention

This invention relates to a temperature-sensitive bleed valve. More specifically, this invention relates to a temperature-sensitive valve adapted to be located in an internal combustion engine air cleaner and connected in a vacuum line and adapted to control vacuum communicated to a vacuum motor which operates a door controlling heat flow to the air cleaner. More specifically, the invention relates to a bleed valve including a bimetallic element adapted to close or permit passage through a bleed opening to atmosphere, the bleed opening permitting the inward flow of air.

2. Description of the Prior Art

In the prior art, there have been attempts to control the temperature of air input to an automobile engine by means of an atmospheric bleed to a vacuum motor control line. An example is shwon in U. S. Pat. No. 3,513,817. In this patent, a bimetallic arm with attached plug, blocks or unblocks a vacuum bleed line depending on the temperature of the air in the engine air cleaner. Prior art devices, however, have comprised multiple parts and required critical adjustments.

Other devices for bleeding vacuum in accordance with temperature have included U. S. Pat. No. 3,319,888. This device has featured a loosely mounted bimetallic diaphragm with a hand-regulateable mounting and been used to control the temperature in the passenger compartment of the automobile.

SUMMARY OF THE INVENTION

Under the present invention, there is provided for thermally modulating the air supply to an engine, a bleed valve sensitive to temperature and comprising a simple bimetallic control disc which is firmly mounted and may be pre-set at the factory. The mounting for the disc, under the present invention, can hold the disc firmly under seal despite variation in the housing structure, and is capable of resisting the effects of vibration.

BRIEF DESCRIPTION OF THE DRAWINGS

Other objects and features of the invention will be apparent to one skilled in the art from a reading of the following specification including the drawings, all of which disclose a non-limiting form of the invention. In the drawings.

DESCRIPTION OF THE PREFERRED EMBODIMENTS

Figure 1:
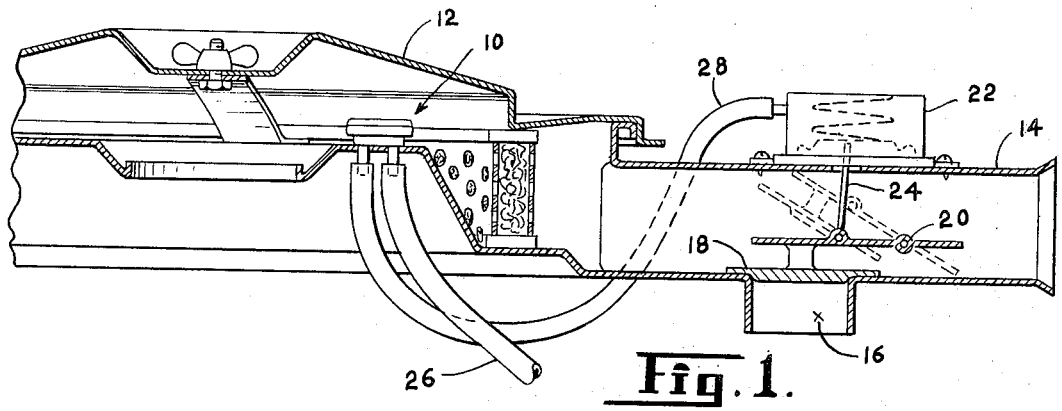
FIG. 1 is a side view, partly in section, of an air cleaner having an embodiment of the invention installed thereon.
Figure 2:
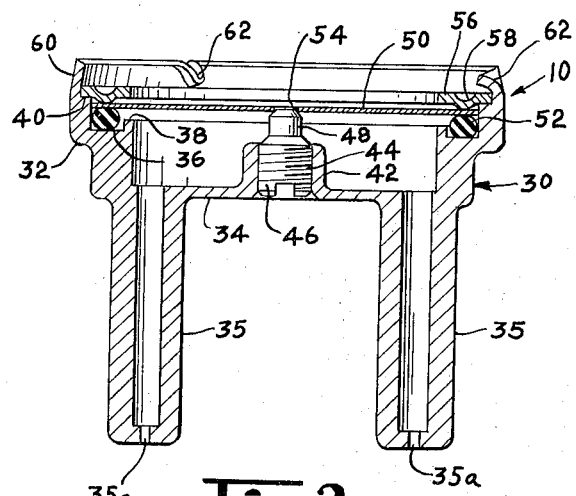
FIG. 2 is a cross-sectional view of the bleed valve embodying the invention and shown in FIG. 1.

Referring more specifically to the drawings, a bleed valve embodying the invention is generally designated 10 in FIG. 2. As shown in FIG. 1, it is mounted in the lower horizontal wall of an air cleaner 12 of an automobile. The inlet 14 to the air cleaner includes a warm air input duct 16 which may be closed off by a door 18 hinged at 20. A vacuum motor 22 is connected through linkage 24 to the door. A hose 26 attached to the intake manifold supplies vacuum to the valve 10, and the hose 28 from the valve 10 communicates with the motor 22.

The system generally described above is as disclosed in the aforementioned U. S. Pat. No. 3,513,817, and the air cleaner 12 is mounted on the intake of an automobile engine, for instance, as is conventional.

The valve 10, as shown in FIG. 2, includes a molded, preferably die-cast, body 30. The body 30 includes a circular shell 32 having a floor 34, a pair of tubes 35 having end orifices 35a, as is well known, communicating with the interior of the body and extending downwardly from floor 34. Spaced above the floor is an annular shelf 36 having an upstanding lip 38 at its inward margin. A second shelf 40 is disposed upward and outward from the first shelf.

Disposed centrally in the floor 34 is an upward boss 42 which carries a central threaded aperture 44. A stud 46 is threadedly disposed in the opening 44 and carries an upward plug 48 which has a tapered upper end.

A bimetallic disc 50 is disposed in the shell resting, as shown, about its periphery on O-ring 52 disposed on the shelf 36. The disc 50 carries a central opening 54 aligned with the upward plug 48.

A retaining ring 56 is provided which may be of stamped sheet metal formed with an annular depression 58 defining a downward rib. As shown, the retaining ring 56 sits on the shelf 40 and the downward rib engages the periphery of the disc holding it down against the O-ring 52. Preferably, the rib and O-ring are of the same means diameter.

Figure 3:
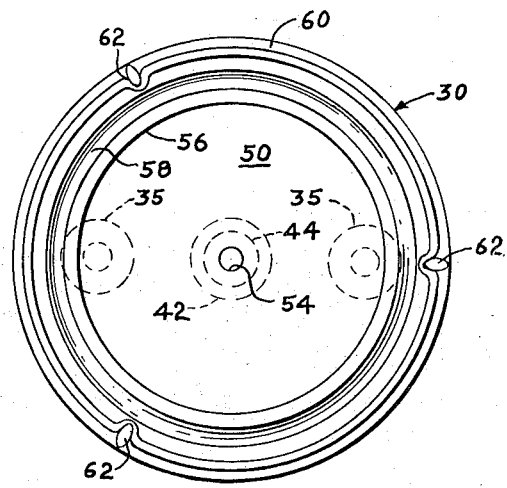
FIG. 3 is a top plan view of the valve of FIG. 2.

Securing the retaining ring 56 in place, an upward flange 60 of the shell is struck inward at points 62 about the periphery thereof (FIG. 3).

Figure 4:
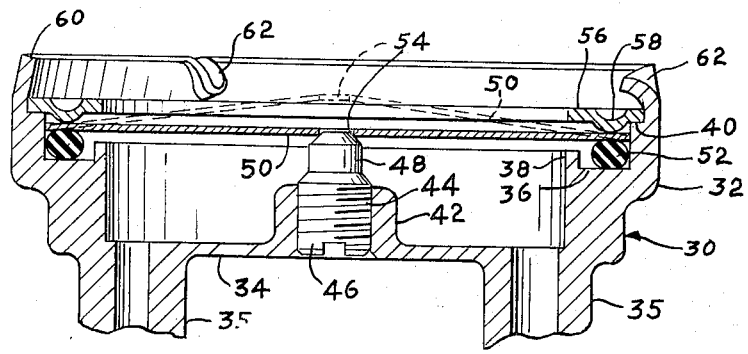
FIG. 4 is a fragmentary enlarged view showing the operation of the bimetallic disc of the valve.

As shown in operation (FIG. 4), the bimetallic disc, at lower temperatures, is relatively flat, as shown in full lines, and the opening 54 therein is blocked by the plug 48. Relating this to the system of FIG. 1, vacuum is thereby communicated from the intake to the motor 22. Upon encountering a rise in temperature, the disc 50, as shown in dotted lines, bulges outwardly to permit the vacuum in line 28 to bleed off the atmosphere through opening 54. This permits spring-biased motor 22 to permit the door 18 to close, shutting off the flow from the duct 16. Operation otherwise is as described in the aforementioned U. S. Pat. No. 3,513,817.

One of the advantages of the valve shown is that it may be pre-set at the factory. This is done by screwing in the stud 46 to where plug 48 just closes the opening 54 at the temperature above which the opening should be unblocked. The stud 46 may be held in this position by epoxy, or other well-known locking means.

The O-ring 52 and the retainer ring 56 serve to hold the disc 50 firmly despite vibrations, and in the appropriate relation to the body irrespective of slight variations in the die-casting.

While in the embodiment disclosed the valve of the invention is shown mounted on the lower wall of the air cleaner, is may be mounted on the upper wall of side walls thereof. It operates effectively irrespective of its position.

I have thus described an embodiment of the invention. It should be understood that the invention is not so limited but covers structures falling within the scope of the invention as defined in the following claim language.

We claim:
1. A temperature-sensitive bleed valve comprising:
a. a molded body comprising a circular shell having a floor with a central boss, the boss having a central bore interiorly threaded, the body having a pair of spaced depending ducts, tubes communicating from the outside to the inside of the body, the shell having a first annular shelf spaced above the floor, the shelf having an upward lip at the inward margin thereof, the shell also having a second annular shelf outward and upward from the first annular shelf;
b. a blocking plug being threadedly disposed in the opening and extending into the body a pre-set amount;
c. an O-ring seal disposed in the first shelf;
d. a bimetallic disc disposed in the shell with its periphery sitting on the O-ring seal, the disc having a central bleed opening normally closed by the blocking stud, the center of the disc being adapted to bow outward of the body upon the occurrence of a warm temperature to open the central bleed opening;
e. a retaining ring disposed on the second shelf and having a depending annular rib approximately the same diameter as the O-ring, the annular rib pressing the periphery of the disc down on the O-ring, the retaining ring being held in position by the inward staking of the upper end of the shell wall.

2. A bleed valve as claimed in claim 1 wherein the plug has a tapered upper end.

3. A bleed valve as claimed in claim 2 wherein the two tubes have restrictive orifices at their lower ends.

4. A bleed valve as claimed in claim 2 wherein the retaining ring is stamped from sheet metal.

5. A bleed valve as described in claim 1 wherein means are provided to hold the blocking plug from rotation.

* * * * *